United States Patent
Ankele

(10) Patent No.: US 12,005,680 B2
(45) Date of Patent: Jun. 11, 2024

(54) INTERIOR PANELING COMPONENT FOR A MOTOR VEHICLE

(75) Inventor: Rainer Ankele, Steinhoring (DE)

(73) Assignee: International Automotive Components Group GmbH, Düsseldorf (DE)

(*) Notice: Subject to any disclaimer, the term of this patent is extended or adjusted under 35 U.S.C. 154(b) by 0 days.

(21) Appl. No.: 13/309,439

(22) Filed: Dec. 1, 2011

(65) Prior Publication Data
US 2012/0142242 A1 Jun. 7, 2012

(30) Foreign Application Priority Data
Dec. 2, 2010 (EP) .................................. 10193499

(51) Int. Cl.
 *B32B 27/00* (2006.01)
 *B29C 51/14* (2006.01)
 (Continued)

(52) U.S. Cl.
 CPC ............ *B32B 27/00* (2013.01); *B29C 51/145* (2013.01); *B29C 51/004* (2013.01); *B29C 51/082* (2013.01); *B60R 13/02* (2013.01); *Y10T 442/637* (2015.04); *Y10T 442/659* (2015.04); *Y10T 442/674* (2015.04)

(58) Field of Classification Search
 CPC ..................................................... B60J 5/0412
 See application file for complete search history.

(56) References Cited

U.S. PATENT DOCUMENTS 3,828,518 A 8/1974 Silk et al.
4,126,914 A 11/1978 Winch et al.
(Continued)

FOREIGN PATENT DOCUMENTS

DE 30 07 343 A1 9/1981
DE 94 22 147 U1 7/1998
(Continued)

OTHER PUBLICATIONS

WO 2010/080967 A1, Anderson et al., Natural Fiber Trim Panel. Jul. 15, 2010.*
Kamath, M., et al; "Thermal Bonding of Nonwoven Fabrics"; <<http://archive.org/web/20070513173912/http://www.engr.utk.edu/Textiles/Thermal%20Bonding.htm>> (archived May 13, 2007, accessed Apr. 4, 2014),8 pgs.
(Continued)

*Primary Examiner* — Marla D McConnell
*Assistant Examiner* — Kevin Worrell
(74) *Attorney, Agent, or Firm* — Grossman, Tucker, Perreault & Pfleger PLLC; Steven J. Grossman

(57) ABSTRACT

The present invention relates to a molded part, in particular, to an interior panel component for a motor vehicle, having a core layer comprising a mixture of natural or synthetic fibers and thermoplastic binding fibers, which are processed to form a nonwoven, and a thermoplastic cover layer, the core layer and the cover layer being fused together and the cover layer being such that the molded part has a visible surface, which is terminated by the cover layer, the visual appearance of the visible surface being at least shaped by the fibers of the core layer. The present invention furthermore relates to the manufacturing of a molded part in which the nonwoven of the core layer is warmed and pre-compressed in a contact heater, and the compressed nonwoven, together with the cover layer is introduced into a mold and recast.

22 Claims, 2 Drawing Sheets

(51) Int. Cl.
*B60R 13/02* (2006.01)
*B29C 51/00* (2006.01)
*B29C 51/08* (2006.01)

(56) References Cited

U.S. PATENT DOCUMENTS

| | | | |
|---|---|---|---|
| 4,946,738 A | 8/1990 | Chenoweth et al. | |
| 5,709,925 A | 1/1998 | Spengler et al. | |
| 6,479,576 B2 | 11/2002 | Eggers et al. | |
| 7,501,362 B2 | 3/2009 | Maier | |
| 2001/0036788 A1* | 11/2001 | Sandoe et al. | 442/389 |
| 2002/0132960 A1* | 9/2002 | Haile et al. | 528/272 |
| 2005/0140059 A1 | 6/2005 | Ernst et al. | |
| 2005/0233660 A1* | 10/2005 | Kimbrell | B32B 7/06 |
| | | | 442/76 |
| 2006/0105663 A1* | 5/2006 | Greulich et al. | 442/394 |
| 2007/0032159 A1* | 2/2007 | Maier | 442/415 |
| 2007/0116991 A1* | 5/2007 | Balthes | B32B 27/302 |
| | | | 428/920 |
| 2007/0286982 A1* | 12/2007 | Higgins | D06N 7/0068 |
| | | | 428/95 |
| 2009/0117801 A1* | 5/2009 | Flack | 442/394 |
| 2009/0311495 A1* | 12/2009 | Squires | D04H 13/00 |
| | | | 428/196 |
| 2010/0066121 A1* | 3/2010 | Gross | 296/146.5 |
| 2010/0093245 A1 | 4/2010 | Bradley et al. | |
| 2010/0247844 A1* | 9/2010 | Curro | A61F 13/512 |
| | | | 428/96 |

FOREIGN PATENT DOCUMENTS

| | | |
|---|---|---|
| DE | 100 52 693 A1 | 3/2001 |
| DE | 100 52 693 A1 | 5/2001 |
| DE | 102 08 524 B4 | 7/2004 |
| DE | 20 2004 014 470 U1 | 7/2005 |
| DE | 102004049271 A1 * | 4/2006 |
| DE | 10 2008 046 770 A1 | 3/2010 |
| DE | 10 2008 062 200 A1 | 7/2010 |
| EP | 0 340 763 A1 | 5/1989 |
| EP | 1 138 479 B1 | 1/2006 |
| EP | 1 688 522 A1 | 8/2006 |
| EP | 1 926 634 B1 | 3/2007 |
| EP | 1 620 260 B1 | 5/2008 |
| JP | H08 108 439 A | 4/1996 |
| WO | 2010/0080967 A1 | 7/2010 |

OTHER PUBLICATIONS

Kamath, M., et al; "Cotton Fiber Nonwovens for Automotive Composites"; International Nonwovens Journal, Spring 2005 (pp. 34-40).
Baithes, G., et al; "Natural Fibers, Thinking Out of the Box"; Proceedings of SPE Automotive Composites Conference, Sep. 14-15, 2004, <<http://www.temp.speautomotive.com/SPEA_CD/SPEA2004/pdf/a/a1.pdf>> (accessed Apr. 4, 2014) (20 pgs).
Bhat, G., et al; "Effect of Binder Fibers on the Processing and Properties of Thermal Bonded Cotton-Based Nonwovens"; Proceedings of the Beltwide Conference, 2002, <<http://utnrl.engr.utk.edu/bhat_publications.html>> (accessed Mar. 11, 2014).
"Bicomponent Fiber"; Auszug der Website www.fibersource.com/f-tutor/cicomponent.htm, aufgerufen über <<http://archive.org/web/ und demnach so veröffentlicht spätestens>> (archived Apr. 29, 2001, accessed Mar. 12, 2014).
Garkhail, S.K., et al; "Mechanical Properties of Natural-Fibre-Mat-Reinforced Thermoplastics based on Flax Fibres and Polypropylene"; Applied Composite Materials 7, 2000, pp. 351-372.
Bottazzi, M., et al; "Wirtschaftlich zu hoher Oberflächenqualität"; www.Kunststoffe/de/kunststoffe-archiv May 2009 (8 pgs) (English abstract attached).
International Nonwovens Journal, vol. 10, No. 2, Summer 2001, (59 pgs).
Biowerkstoff-Report, ISSN 1867-1217, Edition 7, www.renewable-resources.de; published Apr. 2010 (69 pgs).
Cristaldi, G., et al; "Composites Based on Natural Fiber Fabrics"; Woven Fabric Engineering, 17; www.intechopen.com; Aug. 2010 (pp. 317-343).
Prosecution and Opposition of EP2463092 (accessed from European Patent Register.
EP2463092 Apr. 15, 2014 Letter Regarding the Opposition Procedure (accessed from European Patent Register Mar. 1, 2017, 25 pgs).
EP2463092 Nov. 25, 2014 Reply of the Patent Proprietor and Amended Claims (accessed from European Patent Register Mar. 1, 2017, 35 pgs).
EP2463092 Jun. 15, 2015 Preparation for Oral Proceedings (accessed from European Patent Register Mar. 1, 2017, 8 pgs).
EP2463092 Mar. 23, 2016 Grounds for the Decision (accessed from European Patent Register Mar. 1, 2017, 54 pgs).

* cited by examiner

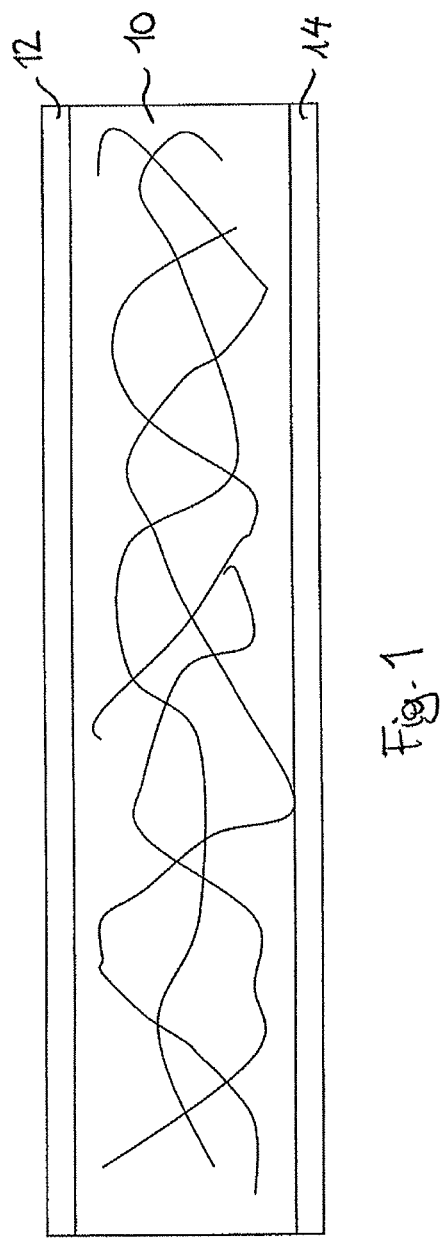

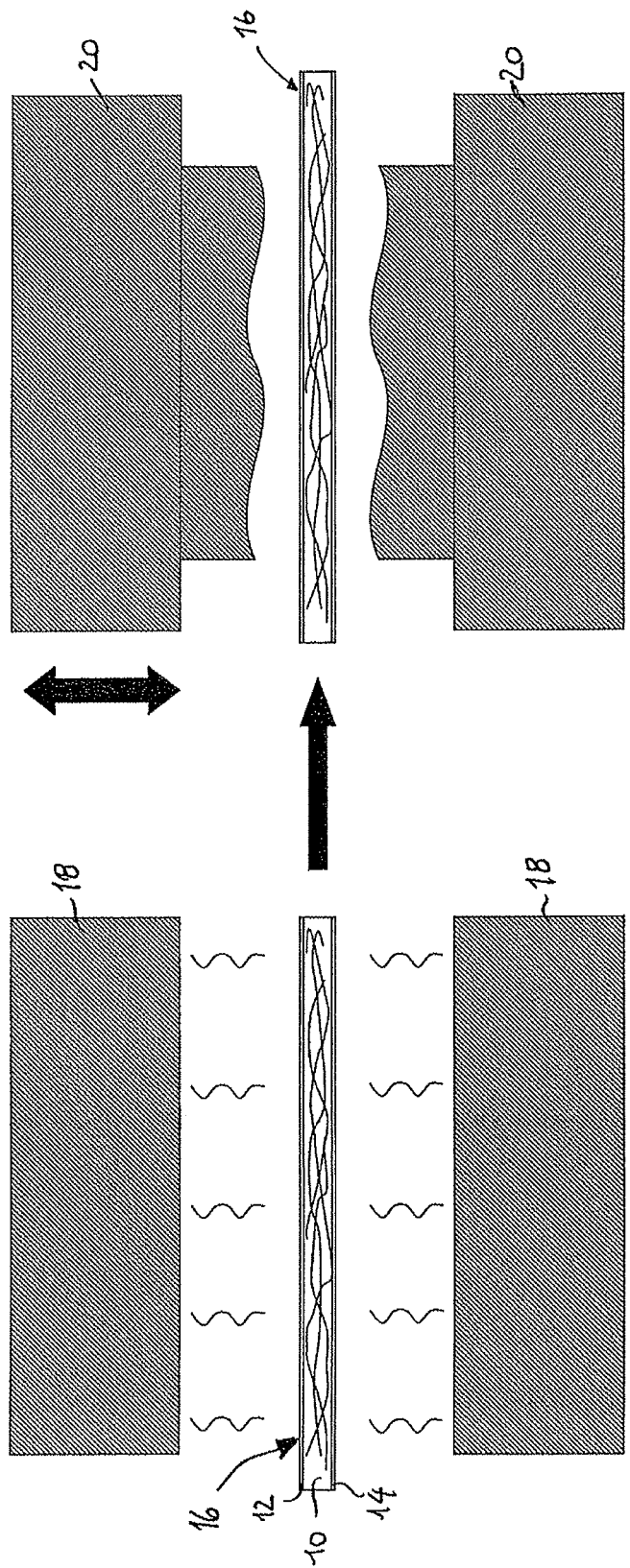

INTERIOR PANELING COMPONENT FOR A MOTOR VEHICLE

The present invention relates to a molded part, in particular, an interior paneling component for a motor vehicle and to a method for its manufacture.

It is known in the prior art to manufacture interior paneling components of motor vehicles, such as an instrument panel, a door panel, a central console, a rear panel shelf, or the like to from nonwoven fabric materials.

For example, DE 102 08 524 B4 describes a method for manufacturing nonwoven fabric molded parts. The molded part includes a nonwoven, which is provided with a thermoplastic binding agent and is thermally or mechanically pre-compacted to form a product precursor. The product precursor is heated until the binding agent is melted, and is pressed in a mold is press. After the binding agent between the fibers of the nonwoven has cooled and set, the compacted molded part having the desired structure is obtained.

DE 94 22 147 U1 discloses a multilayer body for an interior paneling component of a motor vehicle, having a bearing layer, which includes a core layer having a natural fiber and cover layers situated on both sides thereof having binding agents and fibers.

Additional molded parts made of nonwoven are described in DE 30 07 343 A1, DE 10 2008 046 770 A1, in DE 10 2008 062 200 A1, and in DE 20 2004 014 470 U1.

The known molded parts for interior paneling components of motor vehicles, in particular, those made of nonwoven, and also special panelings made of natural fibers have typically cover layers, which form the visible surfaces. Cover materials, such as Decor, PVC, TPO, or other plastic foils, leather or textiles are used, for example, for forming the surface, which laminated onto the molded part using PU foam if necessary. Laminating the molded parts has the objective of protecting them against external influences such as impacts and scratches, penetration of moisture and dirt, UV radiation, and the like, of improving the haptics of the molded part, and to achieve a desired visual appearance such as a certain color or other surface characteristic.

DE 20 2004 014 470 U1 proposes a fiber composite material having a cover layer as usable surface, the material comprising two nonwoven layers pressed together, without a further surface treatment such as laminating or painting being performed. Such components have the disadvantage that their surface is highly susceptible to abrasion and scratches, as well as to the penetration of media such as dirt and liquids. Molded parts made of pressed nonwoven usually have open pores and are not suitable for use in the automotive industry.

It is an object of the present invention to provide a molded part and a method for its manufacture which may be manufactured in a simple manner from a fiber-reinforced composite material and has such a surface characteristic that it is suitable for use as an interior paneling component in a motor vehicle.

This object is achieved by a molded part according to Patent Claim 1 and by a method according to Patent Claim 15.

The present invention provides a molded part, in particular, an interior paneling component for a motor vehicle, having a core layer, which includes a mixture of natural and/or synthetic fibers and thermoplastic binding fibers, which is processed to form a nonwoven, and having a thermoplastic cover layer The core layer and the cover layer are fused together, the cover layer being designed so that it terminates the visible surface of the molded part and the visual appearance of the visible surface is nevertheless determined or at least shaped by the fibers of the core layer. In other words, the cover layer is constructed and bonded to the core layer in such a way that the visual appearance of the molded part is not determined exclusively by the cover layer, but also by the fiber composite material of the core layer. The cover layer is responsible for the surface of the molded part meeting the requirements for a paneling component, such as mechanical strength, abrasion resistance, UV resistance, and in particular media resistance, i.e., resistance to dirt, liquids, acids and bases, etc.

In the preferred embodiment, the core layer contains natural fibers, in particular such as Bombay hemp, hemp, flax, jute, or sisal. The use of renewable raw materials makes sure that the end product is sustainable, at least to a certain degree. In addition, the natural fibers result in a lively and attractive appearance of the finished molded part.

In the preferred specific embodiment, the thermoplastic binding fibers are thermoplastic bicomponent fibers, which include an internal core and an external cladding. The core preferably contains a polyolefin or polyester, such as polyethyleneterephthalate (PET), and the cladding contains a polyolefin such as polyethylene (PE) or polypropylene (PP), a polyamide (PG) or a modified polyester type having a low melting point. The core has a significantly higher melting point than the cladding. Thus, the melting point of a polyester core, for example, may be approximately 240° C., while the melting point of polyethylene, which may be used for the cladding, is approximately 110° C., Examples of bicomponent fibers are described in EP 0 340 763 A1. Such fibers have the advantage that, when the bonding materials made of natural fibers and binding fibers are heated and compacted, only the cladding of the binding fibers melts, and the bicomponent fibers, in addition to the binding effect of the melt, thus form, in addition to the binding effect of the melt, a strong three-dimensional support structure within the nonwoven composite. In addition, it has been surprisingly found that, when thermoplastic bicomponent binding fibers are used, a molded part results, which, despite the cover layer made of polypropylene (PP), polyethylene (PE), or the like, is not glossy, but has a natural matte appearance.

In the preferred embodiment of the present invention, the cover layer is manufactured from a thermoplastic foil, for example, from PP, PA, or PET. The foil may be transparent, semitransparent or translucent, or opaque. It may be light-colored or have different color tones. The use of multilayer foils is also conceivable, for example via a combination of a PE and a polyester layer, the lower-melting PE layer facing the core layer.

The foil has a thickness in the range of approximately 10 μm to 300 μm, for example, in particular approximately 20 μm to 200 μm, and more particularly approximately 50 μm to 100 μm. The foil forms a cover layer, which does not fully cover or conceal the visual appearance of the fiber mixture of the core layer. It is preferably fully transparent, so that the fiber structure underneath it may be recognized. The fiber structure is also recognizable in the case of a translucent, but not fully transparent foil. If an opaque foil is formed to form the cover layer, the cover layer is so thin in any case that the fiber structure of the core layer may still be recognized even through the cover layer, Using the cover layer, different requirements for the surface of the molded part may be met. The cover layer should be selected so that the surface of the molded part is resistant to scratches and abrasion; in addition, the surface should be UV resistant, media resistant, and resistant to the penetration of fluids, dirt, acids, bases, etc. These properties may be achieved is by selecting a suitable material for the thermoplastic foil, a PP foil being preferable.

In the preferred embodiment of the present invention, cover layers are applied to both sides of the core layer. The molded part is thus protected on both sides against penetration of moisture and other foreign bodies. Furthermore, the application of the cover layer to both sides ensures that the molded part does not deform or buckle on one side under the effect of heat and moisture.

The mixture ratio of natural and/or synthetic fibers and binding fibers in the core layer may be approximately 50:50. Natural and/or synthetic fibers and binding fibers may, however, be also provided in a ratio of approximately 40:60 or approximately 60:40 or in other ratios between these values or also in the range of 30:70 to 70:30.

In the preferred embodiment of the present invention, the core layer has at least two nonwoven layers of different qualities. One "cover nonwoven," i.e., a nonwoven layer, which forms the visible surface of the molded part, has a particularly high fiber quality, while the "support nonwoven" underneath it, i.e., a nonwoven, which faces away from the visible layer, may have a lower fiber quality. The fiber quality of the "cover nonwoven" on the visible side of the core layer should be such that the proportion of inhomogeneities such as non-fiber constituents, for example, liber residues, barks, wood particles, shavings and fruit residues, and undissolved fiber bundles is less than 3%, preferably less than 1%, and more preferably less than 0.5%. Such high-quality fibers are commercially available as "premium quality" to fibers. So far, they have not been used in the automobile industry.

In the advantageous embodiment of the present invention, the fibers of the core layer are treated or finished, for example, dyed, bleached, padded, impregnated, coated, and/or provided with UV protection. On the one hand, this may affect the visual appearance of the molded part in that, for example, the natural fibers and the binding fibers are dyed differently; is on the other hand, the quality of the molded part may be enhanced, for example, regarding UV resistance, fungus protection, or other requirements.

Furthermore, the core layer may be designed in such a way that only the fibers of the "cover nonwoven" are treated, i.e., for example, bleached, dyed, padded, or finished, while the nonwoven layers underneath are untreated.

The present invention thus creates a molded part from a fiber composite material having a thermoplastic cover layer, whose external visual appearance is shaped by the fiber material. The cover layer is essentially used for sealing and protecting the molded part and creates a closed surface layer, but does not shape the appearance of the molded part or does not shape it substantially or exclusively. Other coatings of the molded part such as laminating, painting, a foil or Décor are not provided. By mixing (natural) fibers and bicomponent fibers, a matte surface may be obtained even when using an otherwise glossy PP foil or PE foil as a cover layer.

The present invention also provides for a method for manufacturing a molded part of the above-described type. In the present method, the core layer is heated and precompressed in a contact heater, and the precompressed nonwoven, together with the cover layer is introduced into a mold and recast. This is known as a "one-step process," since nonwoven and cover layer are recast in a single operation to form a molded part; i.e., the molded part is not first manufactured from the fiber composite material and the cover layer subsequently applied, for example, by lamination In a first embodiment of the method, the nonwoven, together with a thermoplastic foil, is introduced in the contact heater, and the thermoplastic foil is fused with the nonwoven to form the cover layer, the nonwoven being simultaneously precompressed. Subsequently, the precompressed nonwoven, together with the cover layer formed thereon, is introduced into the mold and recast. In an alternative embodiment, the nonwoven without the cover layer is initially introduced into the contact heater and precompressed, and subsequently the precompressed nonwoven, together with the thermoplastic foil, is introduced into the mold. The thermoplastic foil is fused with the nonwoven in the mold to form the cover layer, and this composite is simultaneously recast. In both cases, the thermoplastic foil is fused onto the compressed nonwoven as a thin film. In general, it is sufficient to heat the nonwoven and optionally the foil in the contact heater and then recasting is performed in the mold with the help of the residual heat. The optional fusing of the thermoplastic foil onto the precompressed nonwoven also may be performed on the basis of the residual heat and with the aid of the melt of the binding fibers, it being also possible to heat the thermoplastic foil separately.

In the method according to the present invention the contact heater is brought to a temperature which is at least equal to the melting point of the binding fibers. The mold has a lower temperature.

The present invention is elucidated below in greater detail with reference to the drawings. In the drawings, FIG. 1 shows a schematic sectional illustration through the material of a molded part according to the present invention, FIG. 2a shows a schematic illustration of a first step of the manufacturing process according to the present invention using a contact heater, and FIG. 2b shows a schematic illustration of a second step of the manufacturing process according to the present invention using a mold press.

As FIG. 1 shows, the material of the molded part according to the present invention has a core layer 10 and two cover layers 12, 14. The core layer is a one-layer or multilayer nonwoven made of a mixture of natural fibers and bicomponent fibers.

The natural fibers may be Bombay hemp, hemp, flax, jute, or sisal, Bombay hemp or flax being preferably used. The present invention also includes the use of synthetic fibers and mixtures of natural and synthetic fibers.

Bicomponent binding fibers are preferably fibers having a thermoplastic core made of polyester such as PET, having a relatively high melting point, and a cladding made of a thermoplastic polymer having a lower melting point, such as PE or PA. The exact choice of material and of the melting points of core and cladding are a function of the application and of the requirements for the molded part, for example, regarding heat resistance. For example, if the molded part is used at temperatures in the range of less than 100° C., it is not necessary to use materials having a melting point of 200° or higher. The use of materials having a lower melting point has the advantage of lower power consumption during the manufacture of the molded part. The present invention also includes the use of single-layer synthetic binding fibers.

The fiber mix of the core layer may have natural fibers and bicomponent fibers in a ratio of 50:50, for example. Mixture ratios of 40:60 or 60:40 or in a range of 30:70 to 70:30 are conceivable, depending on the application.

The nonwoven material of the core layer should have as little as possible inhomogeneities, weight-per-unit-surface fluctuations, or impurities typical to natural fibers, such as fiber bundles, wood particles, liber residues, fruit residues, shavings, etc. Either the entire nonwoven material or at least one nonwoven layer on the visible side of the molded part should have such inhomogeneities in a proportion of less than 3%, preferably less than 1%, and more preferably less than 0.5%. In order not to have to manufacture the entire core layer from such a high-quality and thus expensive nonwoven material, it may be provided that the core layer is composed of a plurality of layers, the highest-quality fiber material being used for the cover layer on the layer surface of the molded part, with a lower quality being allowed for the layers thereunder.

In practice, the core layer may have a specific mass in the range of approximately 200 to 2.000 g/m$^2$ prior to its compression.

If a needle felt is used for the core layer, attention must be paid to the surface of the nonwoven to have as few punctured needling holes as possible to obtain a particularly high-quality impression of the surface visible through the cover layer.

A mentioned above, he fibers may be finished or treated, for example, bleached, dyed, padded, UV treated, or coated. This is true for both natural fibers and bicomponent binding fibers, which preferably have different colors to produce an appropriate surface.

Cover layers in the form of a PP foil are applied to both sides of the core layer as surface protection, the PP foil being fused onto the core layer, forming a cover layer. The starting material of the PP foil has a thickness in the range of approximately 20 to 200 μm, in particular approximately 50 to 100 μm.

If the cover layer is applied to the core layer using heat and pressure, it fuses with the melt of the bicomponent binding fibers in the core layer and thus forms an intimate bond with the core layer. This results in a thin coating of the molded part; it has been surprisingly found that, when using bicomponent binding fibers, the cover layer has a matte appearance, while when using regular synthetic binding fibers and a PP or PA foil as a cover layer, the molded part has a glossy, slightly reflecting surface.

Cover layer 12, 14 may be transparent, translucent, or opaque; it may be dyed as desired and have one or more layers. In any case, however, the cover layer is such that it does not fully cover the visual appearance of the natural fibers or the fiber mix of the core layer. The fiber structure is visible through the cover layer or, at least it shapes or contributes to shaping the external appearance of the molded part.

As FIG. 1 shows, the cover layer is preferably applied to both sides of the core layer in order to prevent the molded part from buckling. This also allows both sides of the molded part to be protected. If, for example, the molded part is used as an instrument panel in a motor vehicle, air channels and other components are often welded to its bottom, so that the molded part is exposed to moisture and other contaminants, as well as to heat fluctuations, from its bottom, against which it must be protected.

The manufacturing process according to the present invention is elucidated with reference to FIGS. 2a and 2b. The molded part according to the present invention is manufactured in what is known as a one-step process. The term one-step process refers to the fact that recasting of the core layer and cover layer occurs in one step, rather than by manufacturing first the core layer of the molded part and subsequently applying the cover layer.

In a first step of the method according to the present invention, a semi-finished part 16 having a core layer 10 and two cover layers 12, 14 is introduced into a contact heater 18. Semi-finished part 16 may be a needle felt made of a mixture of natural fibers and bicomponent binding fibers, onto which two cover foils are adhered; alternatively, the nonwoven and the cover foils may also be introduced into the contact heater separately. The two blocks of contact heater 18 are closed and the semi-finished part is heated. The nonwoven material and of core layer 10 is precompressed and the composite is heated until the cladding of the bicomponent binding fibers melts. This melting bonds the fibers of core layer 10 together and bonds cover layers 12, 14 to core layer 10. At the same time, the cover layer is fused onto the core layer and forms a thin film, which seals the surface of the core layer.

Contact heater 18 is opened and the precompressed, heated semi-finished part 16 is introduced into a press mold 20 as shown in FIG. 2b. When press mold 20 is closed, core layer 10, together with cover layers 12, 14 are recast and brought to the desired shape.

During contact heating 18, for example to a temperature in the range between 180° C. and 220° C., mold 20 is essentially cold or kept slightly heated, for example, in a temperature range of 30° C. to 50° C. Semi-finished part 16 gives off its temperature to press mold 20, and the melt of the bicomponent binding fibers and of the cover layer solidifies, forming a stable molded part.

In practice, the molded part may be manufactured for example from a nonwoven mat having a thickness of approximately 10 mm, this mat being heated in the contact heater and precompressed to a thickness of 4 mm for example. This process may take approximately 60 seconds. In this process, both the claddings of the bicomponent fibers and the cover foil are melted to form a surface protection and an intimate bond of the entire molded part.

This precompressed semi-finished part is subsequently introduced into the press mold and compressed again, for example, to a final thickness of approximately 2 to 3 mm and recast.

While in the preferred specific embodiment the cover foil is also introduced into contact heater 18 to be fused onto the nonwoven mat as a thin film, in an alternative embodiment the cover foil may also be introduced into press mold 20 first. It then bonds with the nonwoven mat due to the melt of the bicomponent binding fiber still present therein. If necessary, the cover foil itself may also be heated prior to being introduced into press mold 20.

After the molded part has been pressed, no additional laminating or other coating process is provided.

LIST OF REFERENCE NUMERALS 10 core layer
12, 14 cover layers
16 semi-finished part
18 contact heater
20 press mold

What is claimed is:
1. A molded part comprising:
an interior panel component for a motor vehicle, the interior panel component having
a core having two sides, the core provided entirely by a nonwoven mat including a mixture of natural and synthetic fibers and thermoplastic binding fibers, wherein the core is formed from a precompressed core compressed from a first thickness to a reduced thickness less than the first thickness, and then press molded to a further reduced thickness which is less than the precompressed reduced thickness, and wherein at least a portion of the thermoplastic binding fibers melt bond the precompressed core when compressed from the first thickness to the reduced thickness less than the first thickness; and a UV resistant thermoplastic cover layer, wherein the cover layer is manufactured from a thermoplastic foil and the foil has a thickness of approximately 10 μm to 300 μm and provides a closed surface layer on an entire first side of the two sides of the core resistant to penetration of fluids into said interior panel component;

wherein at least a portion of the thermoplastic binding fibers of the core and the cover layer are fused together by a melt bond of the thermoplastic binding fibers of the core to the cover layer and the cover layer is such that the molded part has a visible surface which is terminated by the cover layer;

wherein a second side of the two sides of the core forms a further surface of the molded part, wherein the further surface and the visible surface are disposed on opposite sides of the molded part;

wherein the fibers of the nonwoven mat contribute to shaping an external appearance of the molded part such that the visible surface of said closed surface cover layer is at least shaped by the fibers of the nonwoven mat;

wherein the fibers of the non-woven mat form a physical impression in the visible surface of the cover layer, whereby individual fibers of the non-woven mat form the physical impression in the visible surface of the cover layer.

2. The molded part according to claim 1, wherein the thermoplastic binding fibers include bicomponent fibers.

3. The molded part according to claim 1, wherein the foil is transparent, semitransparent, or opaque.

4. The molded part according to claim 1, wherein the foil has a thickness of approximately 20 μm to 200 μm.

5. The molded part according to claim 1, wherein the mixing ratio of natural and synthetic fibers and binding fibers in the core is one of: (a) approximately 50:50, (b) approximately 40:60, or (c) approximately 60:40.

6. The molded part according to claim 1, wherein the core is constructed from at least two nonwoven layers having different proportions of non-fiber constituents.

7. The molded part according to claim 1, wherein the core has a layer of nonwoven at least on the side of the core having the cover layer thereon, wherein a proportion of non-fiber constituents in the nonwoven layer is less than 3%.

8. The molded part according to claim 1, wherein the two sides of the core comprise one side of the two sides having the cover layer thereon and one side of the two sides facing away from the side having the cover layer thereon; and wherein a proportion of non-fiber constituents in the nonwoven mat is greater on the side of the core facing away from the side having the cover layer thereon than on the side of the core having the cover layer thereon.

9. The molded part according to claim 1, wherein the fibers of the core are treated or finished wherein said fibers are dyed, bleached, padded, impregnated, coated, or provided with UV protection.

10. The molded part according to claim 1, wherein the visible surface of the molded part is matte.

11. The molded part according to claim 1, wherein no lamination or other coating except for the cover layer is applied to the molded part.

12. The molded part according to claim 1, wherein the visible surface of the molded part has a matte appearance produced from a glossy cover layer.

13. The molded part according to claim 1, wherein the UV resistant thermoplastic cover layer is transparent or translucent such that a fiber structure of the core is visible through the thermoplastic cover layer.

14. The molded part according to claim 1, wherein the UV resistant thermoplastic cover layer is opaque.

15. The molded part according to claim 2, wherein the biocomponent fibers having an external cladding and an internal core;

wherein the external cladding of the biocomponent fibers is formed of a thermoplastic, and the internal core of the biocomponent fibers is formed of a thermoplastic;

wherein the thermoplastic of the internal core of the biocomponent fibers has a melt temperature which is greater than a melt temperature of the thermoplastic of the external cladding of the biocomponent fibers; and wherein the core and the cover layer are fused together by melt bonding the external cladding of the biocomponent fibers to the cover layer while the internal core of the biocomponent fibers remain unmelted.

16. A molded part comprising:

an interior panel component for a motor vehicle, the interior panel component having a core having two sides, the core provided entirely by a nonwoven mat including a mixture of natural and synthetic fibers and thermoplastic binding fibers; and a UV resistant thermoplastic cover layer, wherein the cover layer is manufactured from a thermoplastic foil and the foil has a thickness of approximately 10 μm to 300 μm and provides a closed surface layer on an entire first side of the two sides of the core resistant to penetration of fluid into said interior panel component;

wherein the core and the cover layer are fused together by a melt bond of the thermoplastic binding fibers of the core to the cover layer and the cover layer is such that the molded part has a visible surface which is terminated by the cover layer;

wherein a second side of the two sides of the core forms a further surface of the molded part, wherein the further surface and the visible surface are disposed on opposite sides of the molded part;

wherein the fibers of the nonwoven mat contribute to shaping an external appearance of the molded part such that the visible surface of said closed surface cover layer is at least shaped by the fibers of the nonwoven mat;

wherein the fibers of the non-woven mat form a physical impression in the visible surface of the cover layer, whereby individual fibers of the non-woven mat form the physical impression in the visible surface of the cover layer.

17. The molded part according to claim 1 wherein the foil has a thickness of approximately 50 μm to 100 μm.

18. The molded part according to claim 16 where the foil has a thickness of approximately 50 μm to 100 μm.

19. The molded part according to claim 1 wherein the part has a thickness of approximately 2 mm to 3 mm.

20. The molded part according to claim 16 wherein the part has a thickness of approximately 2 mm to 3 mm.

21. The molded part according to claim 1 wherein said interior panel component for a motor vehicle comprises an instrument panel.

22. The molded part according to claim 16 wherein said interior panel component for a motor vehicle comprises an instrument panel.

* * * * *